TELEPHONE HOLDING UNIT
Filed Nov. 15, 1950 5 Sheets-Sheet 1
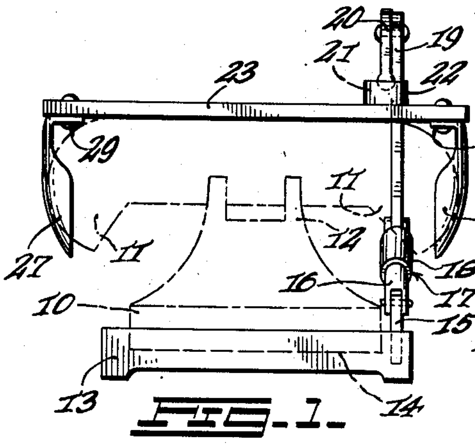
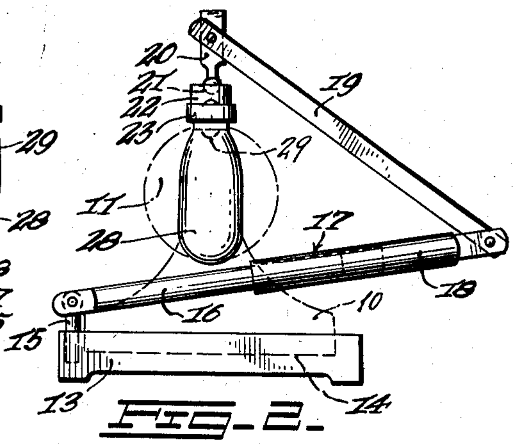
FIG. 1 FIG. 2
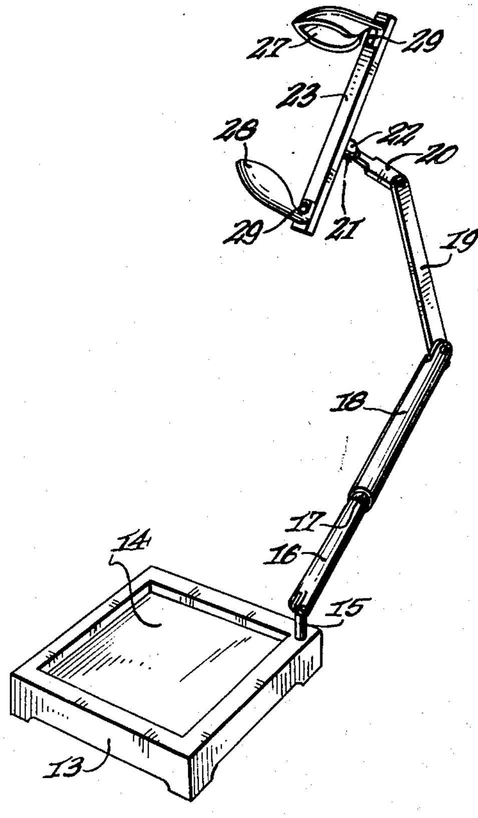
FIG. 3
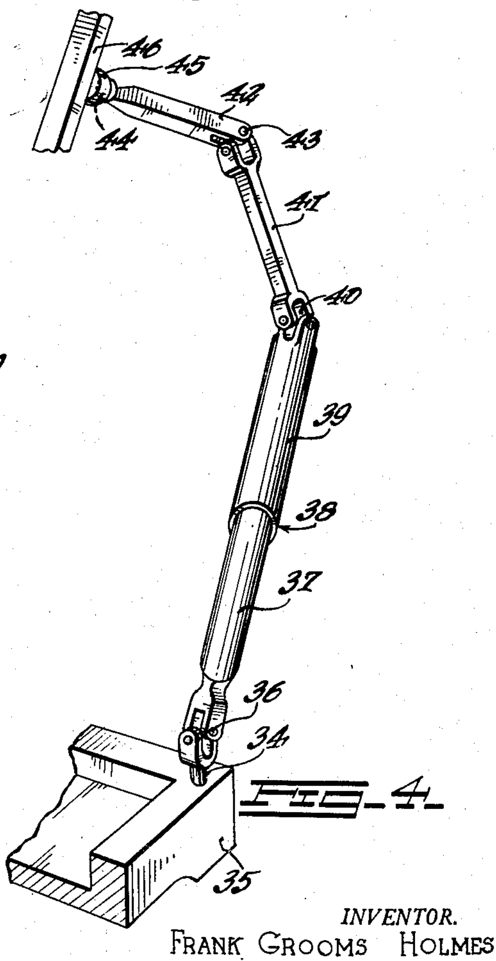
FIG. 4
INVENTOR.
FRANK GROOMS HOLMES
BY
ATTORNEY.

TELEPHONE HOLDING UNIT

Filed Nov. 15, 1950 5 Sheets-Sheet 2

INVENTOR.
FRANK GROOMS HOLMES
BY Zoltan H. Polachek
ATTORNEY.

INVENTOR.
FRANK GROOMS HOLMES
BY Zoltan H. Polachek
ATTORNEY.

INVENTOR.
FRANK GROOMS HOLMES
BY Zoltan H. Polachek
ATTORNEY

Dec. 22, 1953 F. G. HOLMES 2,663,764

TELEPHONE HOLDING UNIT

Filed Nov. 15, 1950 5 Sheets-Sheet 5

INVENTOR.
FRANK GROOMS HOLMES
BY
Zoltan H. Polachek
ATTORNEY

Patented Dec. 22, 1953

2,663,764

UNITED STATES PATENT OFFICE 2,663,764

TELEPHONE HOLDING UNIT

Frank Grooms Holmes, Philadelphia, Pa.

Application November 15, 1950, Serial No. 195,756

6 Claims. (Cl. 179—150)

This invention relates to telephones and pertains more particularly to a device for use with telephones of the type including a pedestal, a handset, and a cradle formed on said pedestal for holding said handset when the telephone is not in use, and which is adapted for maintaining said handset in an extended position when same is not seated in said cradle and is in use.

Heretofore, varied arrangements had been provided in attempts to afford a user of the above-mentioned type of telephone the free use of both hands while telephoning. Some required the uncomfortable use of a shoulder for holding the handset to the head and others were such that each had to be designed for a particular person's use, since each individual's stature required an arrangement which would hold the handset at a particular height above the desk or table upon which the telephone rested.

One object of the present invention is to provide means for holding a telephone handset extendedly and in any position.

Another object of the present invention is to provide means for holding a telephone handset extendedly which are facilitatedly associable with any telephone which includes a pedestal of common variety.

Another object of the present invention is to provide with means for holding a telephone handset extendedly, handset holding means which are resiliently effective and therefore render said handset releasable therefrom.

Another object of the present invention is to provide novel means for making and breaking the telephone controlling circuit while permitting the handset thereof to remain extended and unseated in the provided cradle.

Another object of the present invention is to provide with a device adapted for holding a telephone handset extendedly from the pedestal and cradle of said telephone, novel means whereby said handset may be plurally and selectively positionable to thereby render the device adaptable for use by hospital patients and other bedridden or otherwise handicapped persons.

Another object of the present invention is to provide with means for holding a telephone handset extendedly, other means whereby the first mentioned means may be adjusted in accordance with the distance between the normal permanent position of the telephone pedestal on a desk or other supporting means and the comfortable telephoning position of a user's head.

Another object of the present invention proposes construction of a telephone attachment designed for permitting the telephone circuit to be closed when the telephone is in an extended but not usable position, and for permitting the circuit to be opened when the telephone is more to its desired listening position.

It is a further object of the present invention to construct a telephone attachment of the type disclosed which is simple and durable, which can be quickly and easily attached to a telephone, which is efficient in operation and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of the first embodiment of the invention.

Fig. 2 is a side elevational view of the first embodiment.

Fig. 3 is an isometric view of the first embodiment and illustrates the same effectively extended.

Fig. 4 is a fragmentary isometric view illustrating a modified extensible means applicable to the first embodiment.

Figure 5:
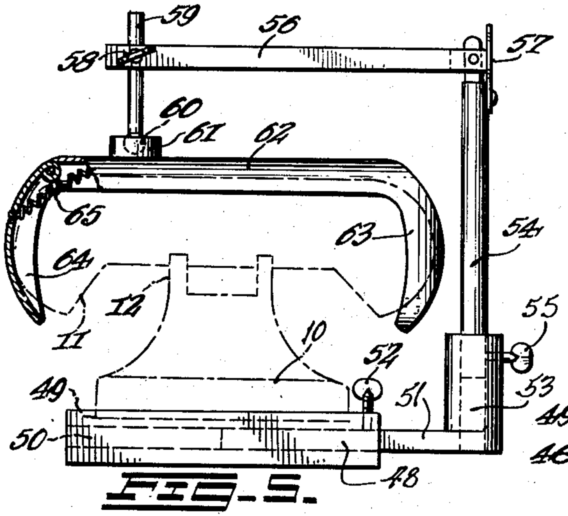
Fig. 5 is a front elevational view illustrating a second embodiment of the invention.

With reference to the drawings in more detail, and particularly to Figs. 1 and 2, it will be seen that the present invention is adapted for association with telephones which include a pedestal 10, a handset 11, and a cradle 12 for holding said handset when the telephone is not in use. Throughout the drawings the telephone will be seen in dot and dash lines only. As also seen in Figs. 1 and 2, the first embodiment provides a base member 13 of cast iron or other material which is suitably weighted for reasons which will be hereinafter explained. Said base member is provided in its upper surface with a recess 14 suitably dimensioned for receiving the said telephone pedestal 10 securely therein. Rotatably seated in one corner of the said base member 13 is an upwardly extending post 15. Pivotally secured to said post 15 is one end of the internal member 16 of a telescoping arrangement 17. An external member 18 of said arrangement 17 is pivotally connected to a first link 19. To the other end of said first link 19 is pivotally connected a second link 20, which second link is provided with a ball 21 adapted to be securely seated in a hub 22. Said hub 22 is fixedly attached to a cross member 23. Suitably secured to the said cross member 23 at the extremities thereof are left and right spoon-shaped retaining members 27 and 28, respectively, formed of spring steel or the like. Each of said retaining members is provided with a bent over portion 29 by which it is secured to the said cross member 23. This arrangement is such that the said handset 11 is resiliently and, therefore, releasably held securely in said frame 23 by said left and right retaining members.

Now, as seen best in Fig. 3, the first embodiment may be extended to thereby position the telephone handset as desired. It will be understood that the frictional engagement of elements at the mentioned pivotal and ball connections is such as to be sufficient for maintaining the arrangement in any desired extended position thereof. Also, the hereinabove mentioned cast iron or otherwise weighted base member 13 is sufficient for preventing tipping or toppling of the embodiment when same is extended.

Fig. 4 illustrates means whereby the first embodiment may be modified to effect a greater versatility thereto. Herein is included a post 34 rotatably seated in a base member 35. Secured to said post 35 by means of a first universal joint 36 is an internal member 37 of a telescoping arrangement 38. Secured to an external member 39 of said telescoping arrangement 38 by a second universal joint 40 is a first link 41. A second link 42 is connected by a third universal joint 43 to said first link 41, and said second link is provided with a ball 44 securely seated in a hub 45 carried fixedly on a cross piece 46. This arrangement, like the first arrangement, is provided with sufficient frictional engagement between the elements thereof for maintaining it in any desired extended position.

Figure 6:
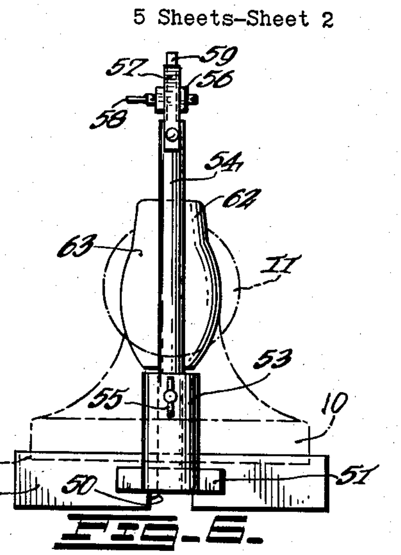
Fig. 6 is a side elevational view of the second embodiment.
Figures 7, 8, 9:
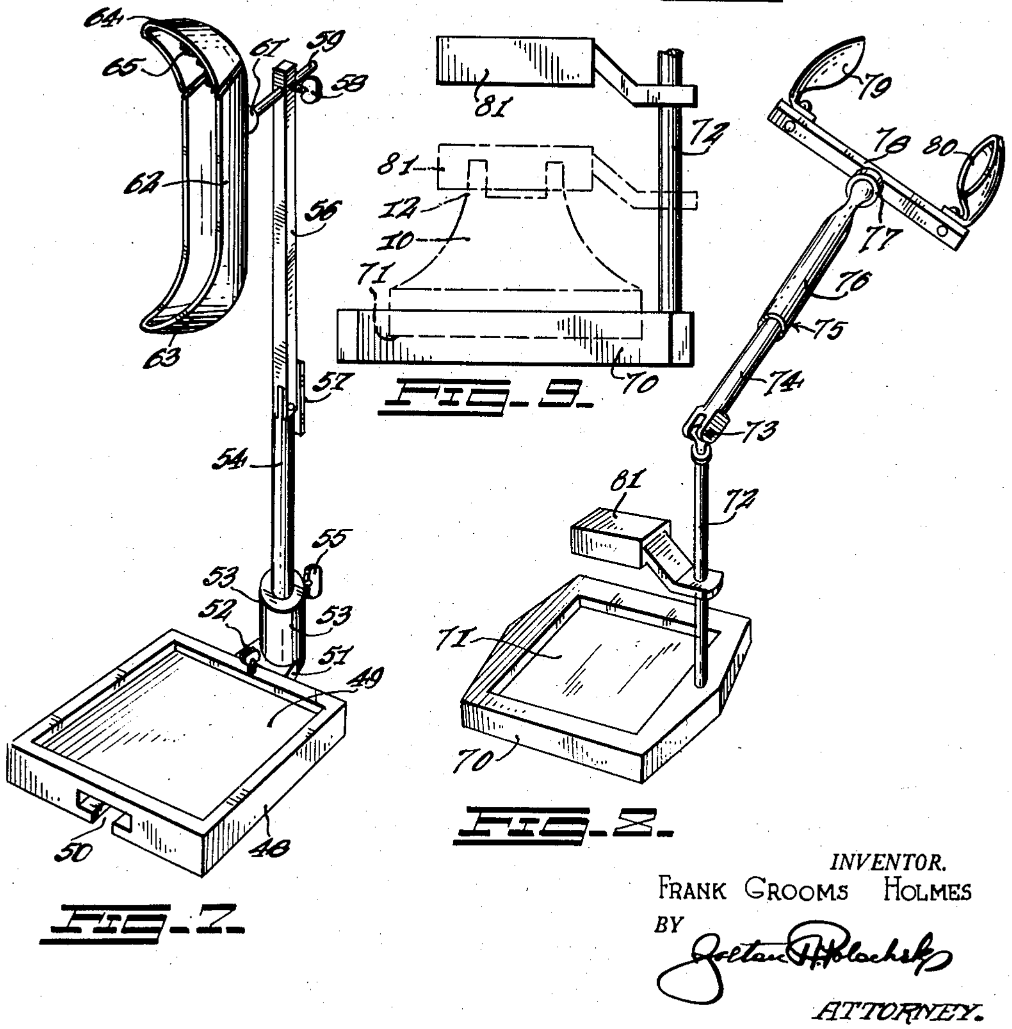
Fig. 7 is an isometric view illustrating the second embodiment effectively extended.
Fig. 8 is an isometric view of a third embodiment and illustrates same effectively extended.
Fig. 9 is a fragmentary front elevational view illustrating the circuit closer of the third embodiment.

A second embodiment, as seen in Figs. 5, 6 and 7, includes a weighted base member 48 having a recess 49 in the upper surface thereof for receiving a telephone pedestal 10 and a transverse undercut channel in the lower surface thereof for receiving a sliding member 51. A set-screw 52 enables the sliding member to be secured in any adjusted sliding position in said channel. Formed at the outer end of said sliding member 51 is a vertically extending cylindrical and axially bored arm 53. Provided for being slidingly disposed in the bore of said arm 53 is a post 54. A set-screw 55 in said arm 53 is adapted to secure said post 54 in any vertically adjusted position thereof.

Pivotally connected to the upper end of said post 54 is an extension arm 56. A leaf spring 57 secured to said post 54 and adapted to associate with said extension arm 56 when same is raised to the position thereof seen in Fig. 7 is provided for maintaining it so raised until manually lowered.

Fitted slidingly in the end of said extension arm 56, and adapted to be positioned adjustably therein by use of a set-screw 58, is a rod 59. A ball 60 at the end of said rod is seated securely in a hub 61 carried fixedly on a cross piece 62 of a handset holding means. Formed off one end of said cross piece 62 is a first spoon-shaped retainer 63 and pivotally connected to the other end of said cross piece 62 is a second spoon-shaped retainer 64. A tension spring 65 interconnects said cross piece and second retainer and is adapted for rendering said retainers effective for resiliently and, therefore, releasably holding the handset 11 therebetween.

It will be evident how the various described adjusting means render the just described embodiment suitable for use by any person in need of a device for permitting free use of both hands while telephoning.

A third embodiment, as seen in Figs. 8 and 9, contemplates the provision of means whereby the telephone handset is maintained extended from the telephone pedestal and cradle while the telephone is controlled by means which is selectively positioned in or removed from said cradle.

Said third embodiment includes a base 70 having a recess 71 for securely receiving the telephone pedestal. An upright rod 72 extends from a lateral position on said base and is pivotally connected, as at 73, to an internal member 74 of a telescoping arrangement 75. The external member 76 of said arrangement 75 is attached by a ball and socket connection 77 to a cross member 78. Left and right handset retaining members 79 and 80, respectively, which are identical to those employed in the first described embodiment are suitably secured to the extremities of said cross member 78. The arrangement described to this point is adapted to maintain the telephone handset in any desired extended position.

For controlling the telephone there is provided a circuit controller 81. Said circuit controller is slidable vertically on the mentioned rod 72 and when in its down position and in the telephone cradle 12, as seen in dot and dash lines in Fig. 9, is effective for breaking the telephone circuit. This is equivalent to having the handset positioned in said cradle. When the said circuit controller 81 is raised out of the cradle the circuit is again completed in the manner it would be if the handset had been removed from the cradle.

Therefore, the just described arrangement permits the said telephone handset to be maintained in any desired position while the said circuit controller is manually positionable for making or breaking the telephone circuit.

In the modification of the invention illustrated in Figs. 10 to 14, there is provided in connection with the base member 13′ means whereby the telephone circuit can be made and broken while leaving the handset, not shown in Figs. 10 to 14, supported in a desired adjusted position for use. This eliminates the necessity for adjusting the position of the handset each time the telephone is to be used. The construction of the base member 13′ is similar to that illustrated in connection with the first form of the invention shown in Figs. 1 to 3, except that it is formed of a suitable weighted synthetic resin or plastic material. The base member 13′ has the recess 14′ in which the pedestal 10′ of the telephone is placed and the rear wall of the base member is formed with a socket 14a for rotatively receiving the post 15 of the arm construction, not shown in its entirety, upon which the handset is positioned. The pedestal 10′ of the telephone has the usual cradle 12′ within which the handset normally rests when the telephone is not in use for depressing the usual switch operating member 12a, shown in dot and dash lines in Figs. 10 and 13.

The means for making and breaking the telephone circuit while leaving the handset supported in a position for use, comprises a U-shaped member 82 which extends about the pedestal 10′ in lateral alignment with the ends of the switch operating member 12a. The U-shaped member 82 is formed entirely of metal and has a heavy intermediate arm portion 82′ extended across the top face of the bottom wall of the base member 13′ within the recess 14′ and beneath the bottom of the pedestal 10′.

The intermediate arm 82′ continues at its ends into upwardly projected arm portions 83 of rigid formation and which extend upward along the sides of the pedestal 10′. Those arm portions 83 are engaged within complementary recesses 84, see particularly Fig. 11, formed in the side walls of the base member 13′ for maintaining the U-shaped member 82 in an upright position.

Figures 10, 12:
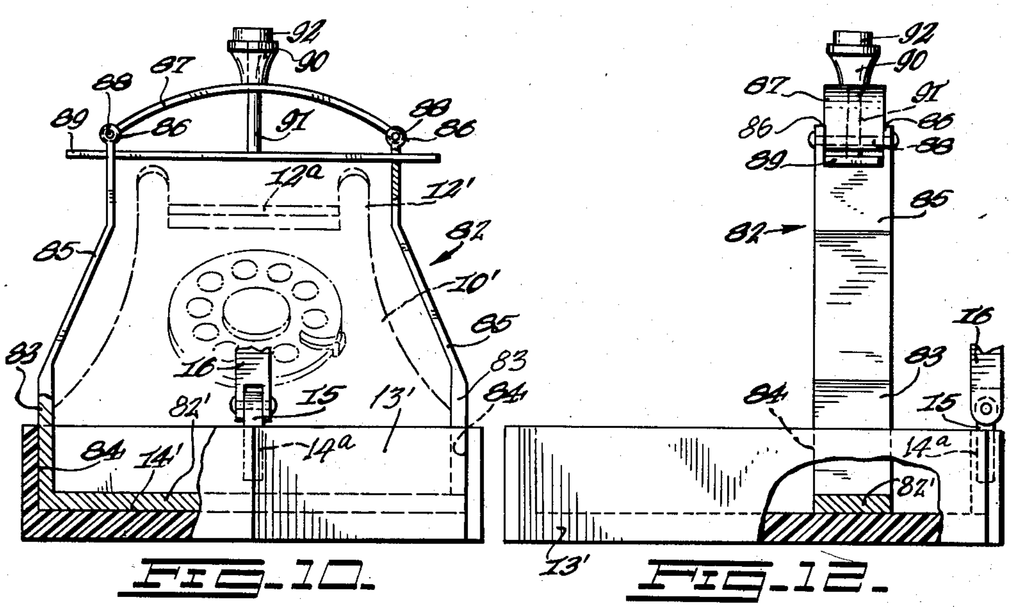
Fig. 10 is a front elevational view similar to Fig. 1, but illustrating a modification of the present invention.
Fig. 12 is an elevational view looking from the right side of Fig. 10.
Figures 11, 13:
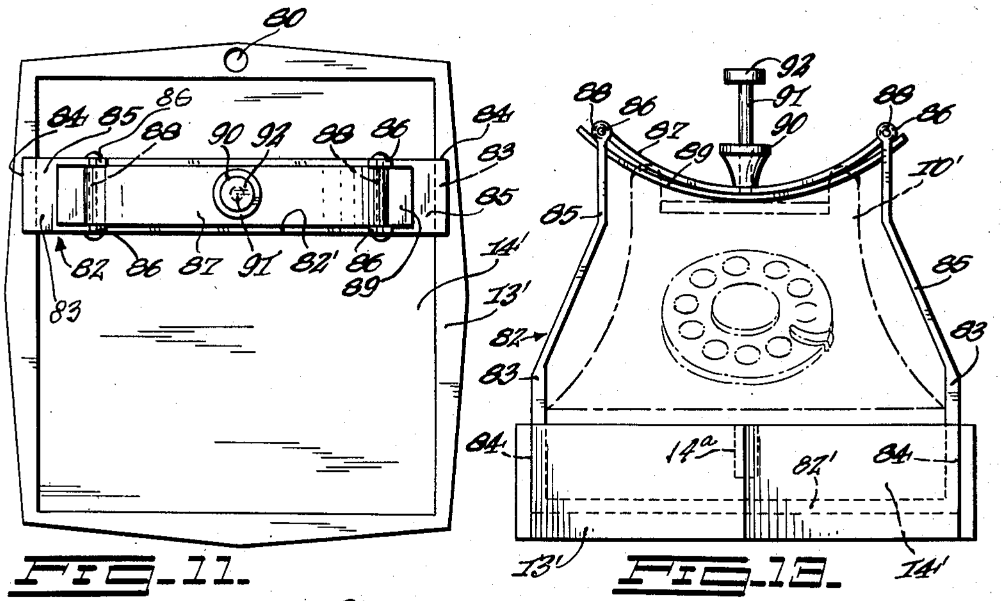
Fig. 11 is a plan view of Fig. 10.
Fig. 13 is a view similar to Fig. 10, but illustrating a different position of the parts.
Figure 14:
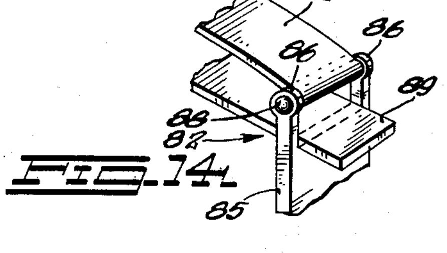
Fig. 14 is an enlarged perspective view of a portion of the device shown in Fig. 10.

The arm portions 83 continue upward as thin flexible upper arm portions 85 each of which is formed at its top end with a spaced pair of bearings 86, see Figs. 11, 12 and 14. Extended between the bearings 86 and over the switch operating member 12a, there is an actuator strip 87 of spring steel. The ends of the actuator strip are thickened and pins 88 are passed through aligned holes formed in the bearings 86 and the thickened ends of the actuator strip 87 for pivotally connecting the ends of that actuator strip to the bearings. While the upper end portions 85 of the U-shaped member 82 are flexible they have a natural set as shown in Figs. 10 and 13 and exert a sufficient force on the actuator strip 87 to retain it in a position arched upward, as shown in Fig. 10, or arched downward, as shown in Fig. 13. The upper end portions 85 flex outward as the actuator strip 87 passes through a dead center from one arched position to the other.

Positioned beneath the actuator strip 87 there is an actuator member 89 also formed of spring steel and having its ends freely slidably rested on the top ends of the upper end portions 85, between the bearings 86 and beneath the ends of the actuator strip.

Attached to the center of the actuator strip 87 there is an upwardly extended tubular knob 90. Attached to the center of the actuator member 89 and projected upwardly therefrom, there is a rod 91. The top end portion of the rod 91 is slidably projected upward through the tubular knob 90 and is formed at its top end with an enlarged head 92.

When the telephone is in use, the parts are in the position shown in Fig. 10, with the actuator strip 87 arched upward and the actuator member 89 raised off the switch operating member 12a freeing the member 12a to be raised to open the telephone circuit. When the telephone conversation is completed, the telephone circuit is closed while leaving the handset in its adjusted position for use, by pushing downward on the tubular knob 90. This causes the actuator strip 87 to be flexed from the upwardly arched position shown in Fig. 10, through a dead center, with the upper ends 85 moving outward, into the downwardly arched position shown in Fig. 13. In that downwardly arched position of the actuator strip 87, it causes the actuator member 89 to be arched downward to, in turn, press downward on the switch operating member 12a closing the circuit. When the phone again rings or is to be used for making an outgoing call, the tubular knob 90 is pulled upward flexing the actuator strip 87 through a dead center from the downwardly arched position shown in Fig. 13 to the upwardly arched position shown in Fig. 10. During the initial portion of the upward movement of the knob 90 it will slide along the length of the rod 91 until it contacts the bottom face of the enlarged head 92 after which it will draw upward on the rod 91 insuring that the actuator member 89 is drawn back to the position shown in Fig. 10.

In other respects, the form of the invention illustrated in Figs. 10 to 14 is similar to that illustrated in Figs. 1 to 3 and like reference numerals are used to identify like parts.

In the modification of the invention shown in Figs. 15 to 19 the device of the present invention is adapted for use with a telephone of the type which includes a pedestal 110 having a cradle 111, and a handset 112 which when resting in said cradle breaks and thereby controls the telephone circuit by pressing down on certain switch buttons which are well known and not herein shown.

Figures 15, 16, 17, 20:
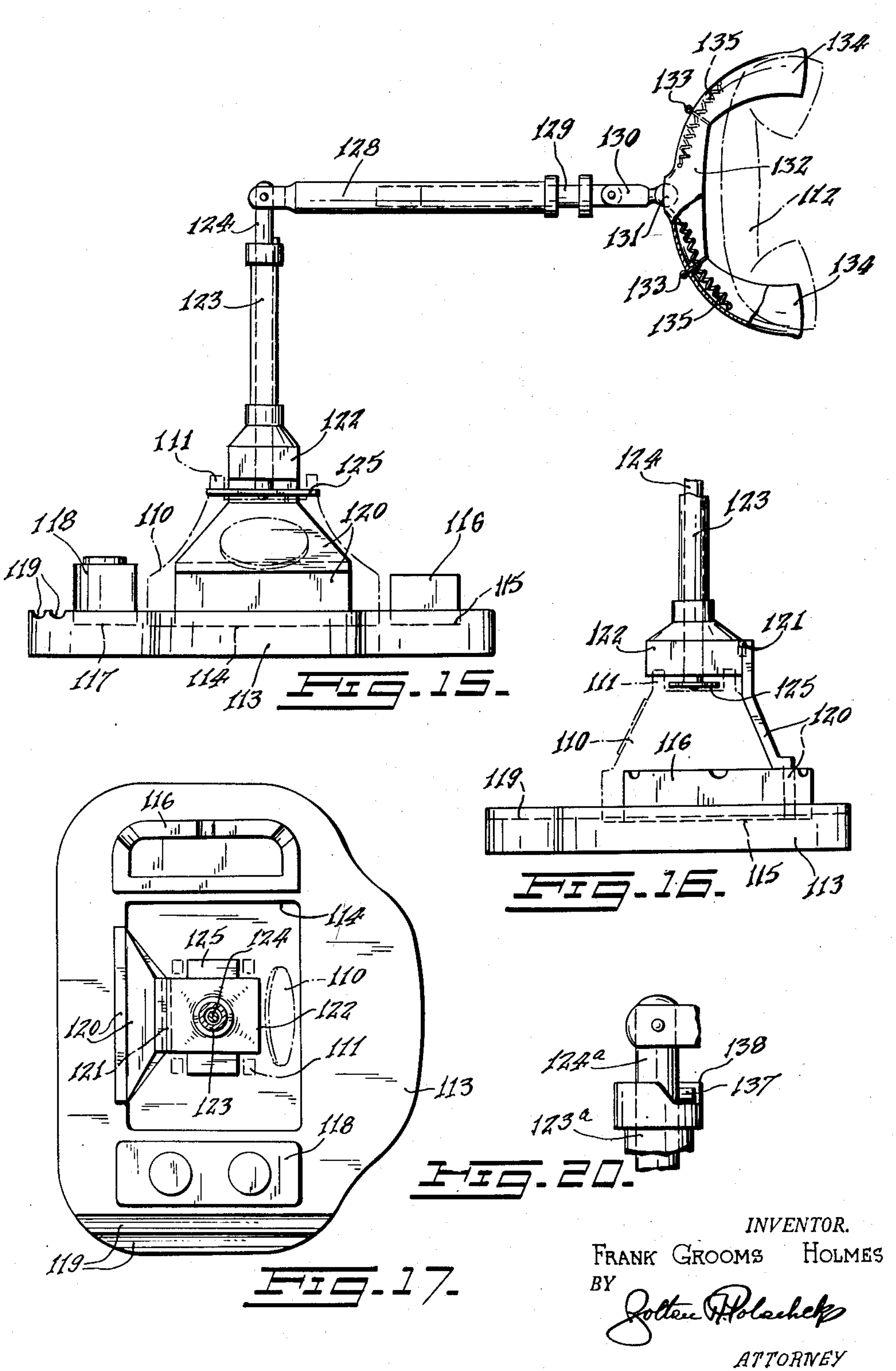
Fig. 15 is a front elevational view of another embodiment of the invention, illustrating the invention effectively extended.
Fig. 16 is a fragmentary side elevational view of the device shown in Fig. 15.
Fig. 17 is a plan view of the device as it is seen in Fig. 16.
Fig. 20 is an enlarged fragmentary front elevational detail of a modified form of the circuit controlling means.

As seen in Figs. 16 and 17, also, the device includes a weighted base 113 which is provided with a recess 114 for receiving the telephone pedestal 110, a second recess 115 for receiving an ash tray 116 and a third recess 117 for receiving an ink well 118. Elongated depressions 119 are also provided in the base for accommodating pencils or pens and the like.

Formed off the rear of the base 110 is an upright portion 120 to the top of which is hingedly connected, as by a pivot pin 121, a forwardly extending member 122. Said forwardly extending member, in consequence of its hinged connection, may be raised in order that the telephone pedestal 110 may be placed in its related recess 114 and is thereafter adapted to be normally positioned in the telephone cradle 111. A bore in the forwardly extending member is in register with that of a tubular member 123 suitably secured thereto.

Provided to move slidingly vertically in the tubular member 123 is a rod 124 upon the lower end of which is loosely attached a bar 125.

Figure 18:
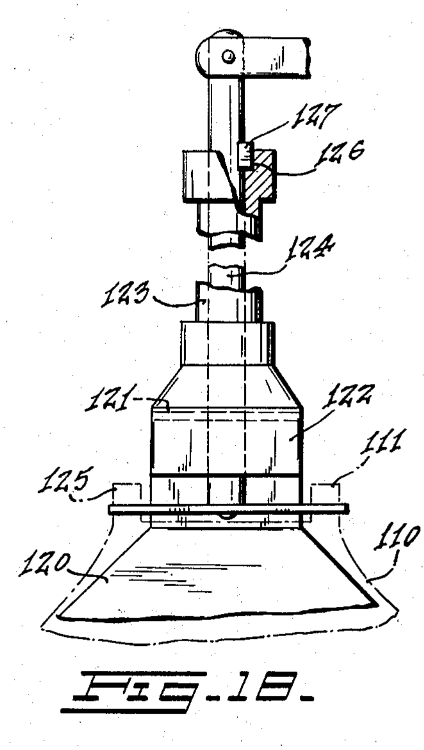
Fig. 18 is an enlarged fragmentary front elevational detail of one form of the circuit controlling means.
Figure 19:
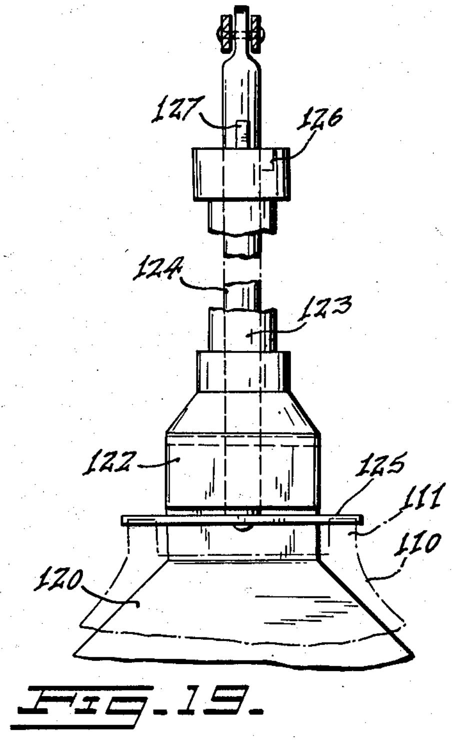
Fig. 19 is a front elevational view of the form shown in Fig. 13 but with certain components differently positioned.

As perhaps better seen in Figs. 18 and 19, the mentioned tubular member 123 is provided with a notch 126 while the rod 124 has secured therein a tongue 127.

With the rod 124 in its lowered position, as seen in Figs. 15 and 18, the tongue 127 is seated in notch 126 and the bar 125 at the lower end of the rod is effective for pressing on the telephone switch buttons and thereby maintaining the telephone circuit broken. However, raising the rod 124 to thereby raise the tongue 127 from the notch 126 and turning the rod slightly to rest said tongue on the edge of the tubular member 123 effects the raising of the bar 125 and maintains the telephone circuit effectively opened.

Pivotally connected to the upper end of the rod 124 is an arm 128 which is provided therein with a telescoping arm 129. Pivotally secured to the telescoping arm is a connector 130, which by means of a ball and socket connection 131 is attached to the center member 132 of the means for holding the aforementioned telephone handset 112. Hingedly connected to either side of the center member 132, as at 133, is a cup member 134. Springs 135 interconnect the cup member 134 with the center member and, thusly, the telephone handset 112 is resiliently and removably held therebetween.

It will be seen that the just described arrangement may have the base thereof positioned favorably on a desk or the like and the components making up the extending means may be adjusted as to locate the telephone handset in any desired position. Also, it will be seen the telephone circuit may be facilitatedly controlled even while maintaining the handset extendedly supported.

Figures 21, 22, 23:
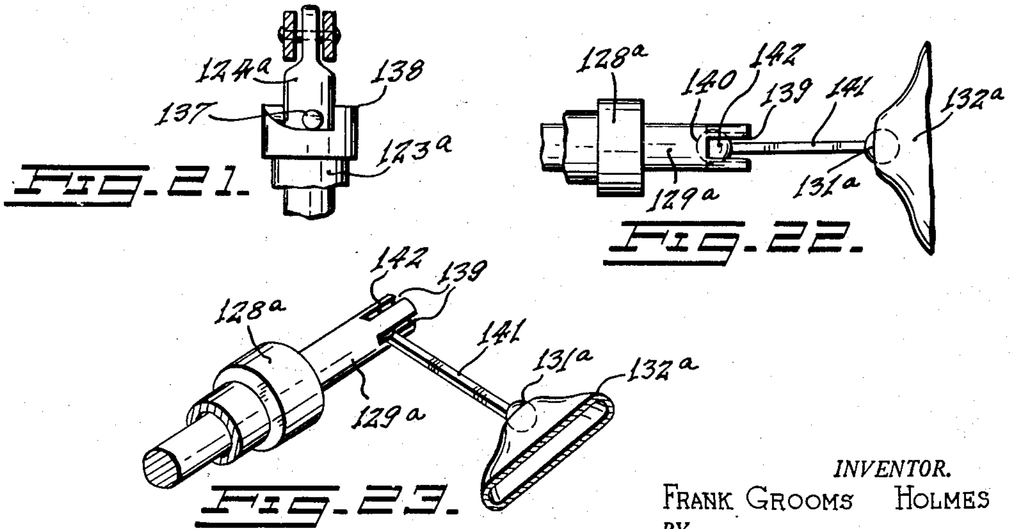
Fig. 21 is a side elevational view of the form shown in Fig. 20.
Fig. 22 is an enlarged fragmentary elevational detail of a modified form of connection between the handset extending and handset holding means.
Fig. 23 is a fragmentary isometric view of the connection shown in Fig. 22, illustrating the same in one of its plural and selective positions.

Figs. 20 and 21 show a modified means for controlling the telephone circuit. Herein a tubular member $123^a$ is formed on its upper edge with a cam surface 136, and a rod $124^a$ is provided with a radially extending stud 137. A shoulder 138 also formed on the tubular member $123^a$ cooperates with the stud 137 and prevents the rod from rotating in one direction. However, rotation of said rod in the other direction causes the stud to ride up on the cam surface 136 to thereby raise the rod. It will be obvious how this modification may be employed in the modification of the invention shown in Figs. 15 to 19 and how it will be effective for making and breaking the telephone circuit simply by swinging the handset holding means into and out of a listening position.

In Figs. 22 and 23 there is illustrated a modified connection between the handset holding means and the extending means. Herein a telescoping arm $129^a$ fitted in an arm $128^a$ is formed at its extremity with a plurality of radial slots 139 and a socket 140 which said slots intersect. A connector 141 is formed with a ball 142 which is seated in said socket 140 and the cross-sectional dimensions of said connector are such as to permit it to be moved selectively into any one of the mentioned slots 139 and project radially therefrom. The other end of the connector is attached by means of a ball and socket connection $131^a$ to a center member $132^a$ of a handset holding arrangement of the type described above.

This arrangement lends additional versatility to the invention in that it permits the telephone handset to assume and be suitably supported in a still greater variety of positions. It will be seen that such a provision renders the device more adaptable and facilitates the use thereof for telephoning while in a reclining position, as is necessary when a person is bed-ridden.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the class described adapted for use with telephones including a pedestal, a cradle on said pedestal, and a handset adapted to be held in said cradle; comprising a base member; means whereby said pedestal may be secured in said base member; extensible means secured in said base member; and handset holding means located at the end of said extensible means, and means engaged about said pedestal for opening and closing the telephone circuit while leaving the handset supported in said handset holding means in an operative position, said means including a U-shaped member engaged about said pedestal and having flexible arm portions extended upward along the sides of said pedestal, an actuator strip having its ends pivotally attached to the top ends of said arm portions and urged by said arm portions into an upwardly arched or a downwardly arched position, and an actuator member beneath said actuator strip and connected with said actuator strip to be urged thereby into a circuit closing position or to be held thereby in a circuit opening position.

2. A device for use with a telephone including a cradle and a pedestal; comprising a base member receiving said pedestal, a U-shaped member retained in said base and extending over said cradle, an actuator strip pivoted to said U-shaped member, an actuator member slidably retained on said U-shaped member and actuating means secured to said actuating strip to cause said actuator strip and member to close or release the telephone switch.

3. The combination of claim 2 wherein said U-shaped member includes a thickened horizontal portion, grooves in said base, and the vertical arms of said member being seated in said grooves and extending above said cradle.

4. The combination of claim 3 wherein said actuator strip includes thickened ends, bearings on said vertical arms and means pivotally connecting the ends of said actuator strip to the bearings.

5. The combination of claim 2 wherein said actuator strip is of spring steel.

6. The combination of claim 2 wherein said actuating means includes a vertical rod secured to said actuator member and a knob secured to said actuator strip and slidably retained on said rod to raise or lower said last named strip.

FRANK GROOMS HOLMES.

References Cited in the file of this patent

UNITED STATES PATENTS

| Number | Name | Date |
|---|---|---|
| 806,372 | Silverman | Dec. 5, 1905 |
| 2,020,527 | Swaine | Nov. 12, 1935 |
| 2,048,865 | Hufschmid | July 28, 1936 |
| 2,260,703 | Daly | Oct. 28, 1941 |
| 2,310,032 | Mathieson | Feb. 2, 1943 |
| 2,435,806 | Anderson | Feb. 10, 1948 |